(12) United States Patent
Mitsudomi et al.

(10) Patent No.: US 7,064,852 B2
(45) Date of Patent: Jun. 20, 2006

(54) IMAGE FORMING APPARATUS FOR EXECUTING A PLURALITY OF JOBS AND METHOD OF CONTROLLING THE APPARATUS

(75) Inventors: Toshiyuki Mitsudomi, Yokohama (JP); Masahiko Taniguchi, Kawasaki (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 928 days.

(21) Appl. No.: 09/975,983

(22) Filed: Oct. 15, 2001

(65) Prior Publication Data

US 2003/0072020 A1    Apr. 17, 2003

(51) Int. Cl.
*G06F 3/12* (2006.01)

(52) U.S. Cl. ............... 358/1.15; 358/1.13; 358/1.16; 399/82

(58) Field of Classification Search ............... 358/1.13, 358/1.2, 448, 1.6, 1.16, 1.15, 1.9; 399/82, 399/83

See application file for complete search history.

(56) References Cited

U.S. PATENT DOCUMENTS

| 5,923,942 A | * | 7/1999 | Nuggehalli et al. | 399/389 |
| 6,356,721 B1 | * | 3/2002 | Motoyoshi et al. | 399/82 |
| 6,466,326 B1 | * | 10/2002 | Shima | 358/1.12 |

FOREIGN PATENT DOCUMENTS

JP    A1 11-232060    8/1999

* cited by examiner

*Primary Examiner*—King Y. Poon
*Assistant Examiner*—Lucas Divine
(74) *Attorney, Agent, or Firm*—Foley & Lardner LLP (57) ABSTRACT

When there occurs one of a copy JOB, a printer JOB, and a facsimile JOB, the above JOB is classified into four types and registered into one of a copy JOB queue section 73a, a saved JOB queue section 73b, a priority JOB queue section 73c, and an ordinal JOB queue section 73d. When printing of a print section is completed, whether or not a JOB is registered in any queue section is judged and repeatedly monitored in the order of the queue sections 73a, 73b, 73c, and 73d. When a JOB registered is confirmed, the confirmed JOB is promptly executed.

20 Claims, 6 Drawing Sheets

IMAGE FORMING APPARATUS FOR EXECUTING A PLURALITY OF JOBS AND METHOD OF CONTROLLING THE APPARATUS

BACKGROUND OF THE INVENTION

A complex image forming apparatus which is provided with a copy mode function for optically reading an image of a document set on a document stand and printing the above read image on paper and a printer mode function for printing an image transferred from an external device, for example, a personal computer, on paper, is known.

In the complex image forming apparatus, there may occur some jobs simultaneously such as a copy JOB by use of the copy mode function and a printer JOB by use of the printer mode function. In this case, these jobs are executed sequentially.

When there is no paper of the proper size for a first JOB, the first JOB cannot be started. When a user feeds the proper sized paper, the first JOB is started, and when the first JOB is completed, the second JOB is started.

In this case, even if there is no proper sized paper for the first JOB, when there is proper sized paper for the second JOB, the second JOB is thought to be executable. The second JOB, however, cannot actually be started until the first JOB is completed. This waiting time is of no use, and may delay or frustrate the user.

BRIEF SUMMARY OF THE INVENTION

An object of the present invention is to provide image forming apparatus capable of efficiently executing a plurality of JOBs in an extremely short time.

An image forming apparatus executing a plurality of JOBS comprising:

a document stand which puts a document thereon;

a reading section for a copy mode which optically reads an image of the document put on the document stand;

an input section for a printer mode which enters an image transferred from an external device;

a plurality of paper holding sections where paper is respectively accommodated in different sizes;

a print section which prints the image read by the reading section and the image entered by the input section on the paper of the respective paper holding sections;

an operational section which specifies the size of the paper;

first, second, third, and fourth registers;

a first judgment section which checks whether or not the proper sized paper for the JOB exists in the paper holding sections when there occurs a copy JOB for printing the image read by the reading section on the paper of the size specified by the operational section, or a printer JOB for printing the image entered by the input section on the paper of the size specified by the external device;

a second judgment section which checks whether or not the JOB judged in the first judgment section is the above copy JOB when the judgment result of the first judgment section is positive;

a first control section which registers the above copy JOB into the first register when the judgment result of the second judgment section is positive;

a second control section which registers the JOB judged in the first judgment section into the second register as a saved JOB when the judgment result of the first judgment section is negative;

a third judgment section which checks whether or not the number of copies for the JOB judged in the second judgment section is less than a predetermined reference number when the judgment result of the second judgment section is negative;

a third control section which registers the JOB judged in the third judgment section into the third register as a priority JOB when the judgment result of the third judgment section is positive;

a fourth control section which registers the JOB judged in the third judgment section into the fourth register as an ordinal JOB when the judgment result of the third judgment section is negative;

a monitor section which continually monitors whether or not a JOB is registered in the respective registers in the order of the first, the second, the third, and the fourth registers when printing of the print section is completed; and a fifth control section which executes the registered JOB at once when a JOB registered is found in the above monitor section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, an embodiment of the present invention will be described with reference to the drawings.

Figure 1:
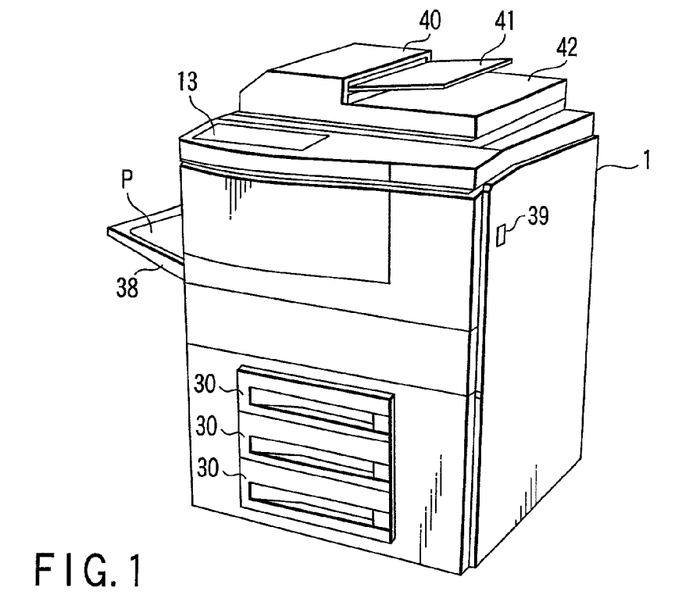
FIG. 1 is a view showing an appearance of the apparatus according to an embodiment of the present invention.
Figure 2:
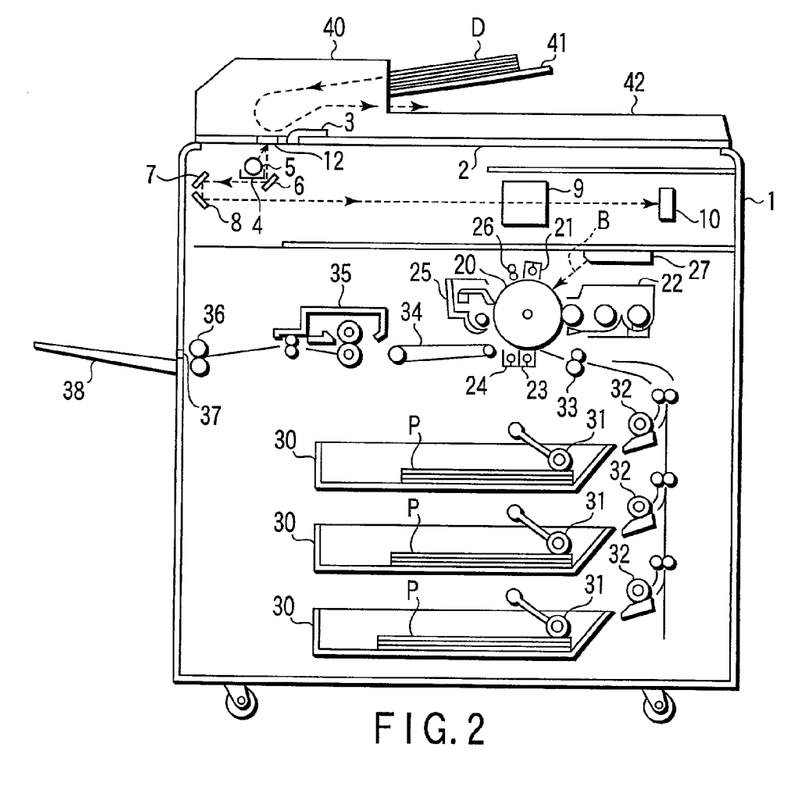
FIG. 2 is a view showing an internal structure of the apparatus according to the embodiment.

As illustrated in FIGS. 1 and 2, a transparent document stand (glass plate) 2 for putting a document thereon is provided on the top portion of a main body 1. An indicator 3 is provided on one end portion of the document stand 2. A reference position for setting a document is indicated by a stepped portion of the indicator 3 and the document stand 2.

A plurality of document sensors 11 described later are provided under the rear surface of the document stand 2.

These document sensors 11 optically detect the size and the presence of a document D set on the document stand 2.

A carriage 4 is provided under the document stand 2 and an exposure lamp 5 is provided on the carriage 4. The carriage 4 and the exposure lamp 5 form an exposing means. The carriage 4 can move (forward and backward) along the rear surface of the document stand 2. While the carriage 4 moves forward and backward along the document stand 2 with the exposure lamp 5 lit, the document D put on the document stand 2 is exposed to light.

An image of the document D is obtained from the reflected light through this exposure and projected on a CCD (Charge Coupled Device) 10 by mirrors 6, 7, and 8 and a lens block of variable power 9. The CCD 10 has a plurality of photoelectric conversion elements in the acceptance area, and supplies an image signal corresponding to the image of the document D by line scan on the acceptance area and repetition of the line scan.

The image signal supplied from the CCD 10 is amplified and converted into a digital signal. The digital signal is processed in an image processing section 74 described later, and then supplied to a laser unit 27. The laser unit 27 emits a laser beam B depending on the input signal.

A window 12 for reading a document therefrom is provided in the portion adjacent to the indicator 3 of the document stand 2. The window 12 is formed in a shape corresponding to the longitudinal direction of the indicator 3.

An automatic document feeding device (ADF) 40 which also serves as a cover of the document stand is provided on the document stand 2, the indicator 3, and the window 12 in an openable way. The automatic document feeding device 40 has a tray 41 for setting a document, feeds a plurality of documents D set in the tray 41 to the window 12, passing them over the window 12, one by one, and discharges them to a tray 42. When the automatic document feeding device 40 operates, the exposure lamp 5 lights up at a position corresponding to the window 12 and the light irradiates the window 12. The documents D passing over the window 12 are exposed to the irradiated light on the window 12.

A reflected light image is obtained from the document D through this exposure and is projected on the CCD 10 by the mirrors 6, 7, and 8 and the lens block of variable power 9.

Figure 3:
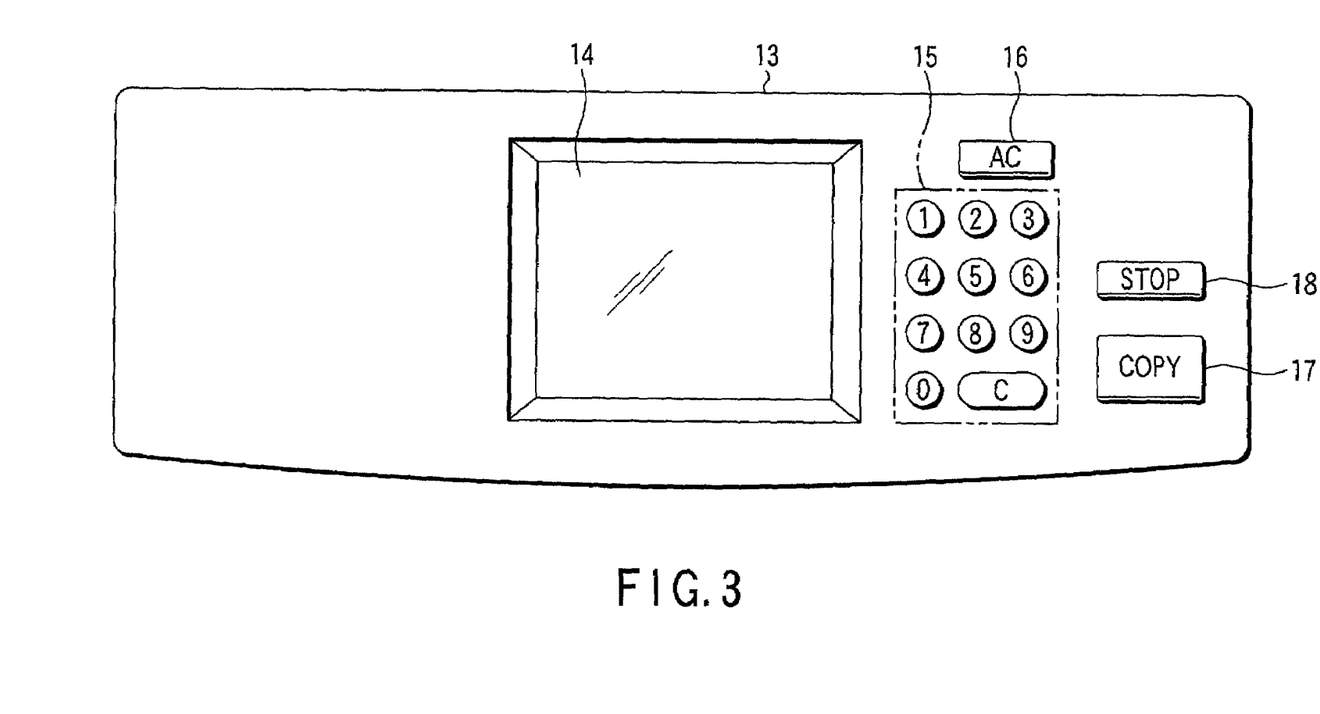
FIG. 3 is a view showing a structure of a control panel of the embodiment.

A control panel 13 for setting an operational condition is provided on the upper surface of the main body 1 at a position disconnected with the automatic document feeding device 40. As illustrated in FIG. 3, the control panel 13 comprises a liquid crystal display 14 of a touch panel type, ten keys 15 for numeric input, an all-clear key 16, a copy key 17, and a stop key 18. With the liquid crystal display 14, it is possible to enter information by finger and display various information including the entered information. A user finger-touching the liquid crystal display 14 enables various settings of the conditions and the type of an image, and this panel works as a first operational section for specifying the size of the paper P and a second operational section for setting and resetting the "automatic setting mode of reference number of the paper".

A rotatable photoconductive drum 20 is provided in a central portion of the main body 1. A static charger 21, a developing unit 22, a transferring unit 23, a stripping unit 24, a cleaner 25, and a static eliminator 26 are sequentially provided around the photoconductive drum 20. The laser beam B emitted from the laser unit 27 is irradiated on the surface of the photoconductive drum 20, passing through the space between the static charger 21 and the developing unit 22.

A plurality of paper holding sections, that is, paper cassettes 30, are provided in the bottom portion of the main body 1. Many sheets of different sized sheets of paper P are respectively accommodated in these paper cassettes 30. When the copy key 17 is pushed, one sheet of paper P is taken out from one of the paper cassettes 30. A pick-up roller 31 is provided in each cassette as a means for taking out the sheet. The picked-up paper P is moved away from the paper cassette 30 by a separator 32 and transferred to a resister roller 33. The resister roller 33 feeds the paper P between the photoconductive drum 20 and the transferring unit 23 at a timing dependent on the rotation of the photoconductive drum 20.

The static charger 21 produces a static charge on the surface of the photoconductive drum 20, by applying a high voltage to it. The laser beam B emitted from the laser unit 27 is irradiated on the surface of the electrified photoconductive drum 20. The laser unit 27 mainly scans (line scans) the surface of the photoconductive drum 20 in one direction, and an electrostatic latent image corresponding to the read image from the document D is formed on the surface of the photoconductive drum 20 by repeating the main scan according to the rotation of the photoconductive drum 20.

The electrostatic latent image on the photoconductive drum 20 is developed with a developer (toner) by the developing unit 22. This developed image is transferred to the paper sheet P by the transferring unit 23. The paper sheet P onto which the developed image is copied is separated from the photoconductive drum 20 by the stripping unit 24. Developer and an electric charge remain on the surface of the photoconductive drum 20 after the paper sheet P is removed. The remaining developer is removed by the cleaner 25. The remaining electric charge is eliminated by the static eliminator 26.

The paper sheet P removed from the photoconductive drum 20 is transferred to a fixer 35 via a conveyer belt 34. The fixer 35 thermally fixes the copied image on the paper P. The fixed paper P is transferred to an outlet 37 by a feeding roller 36 and discharged to a tray 38 outside of the main body 1 from the outlet 37.

A power switch 39 is provided on the other side of the main body 1.

Figure 4:
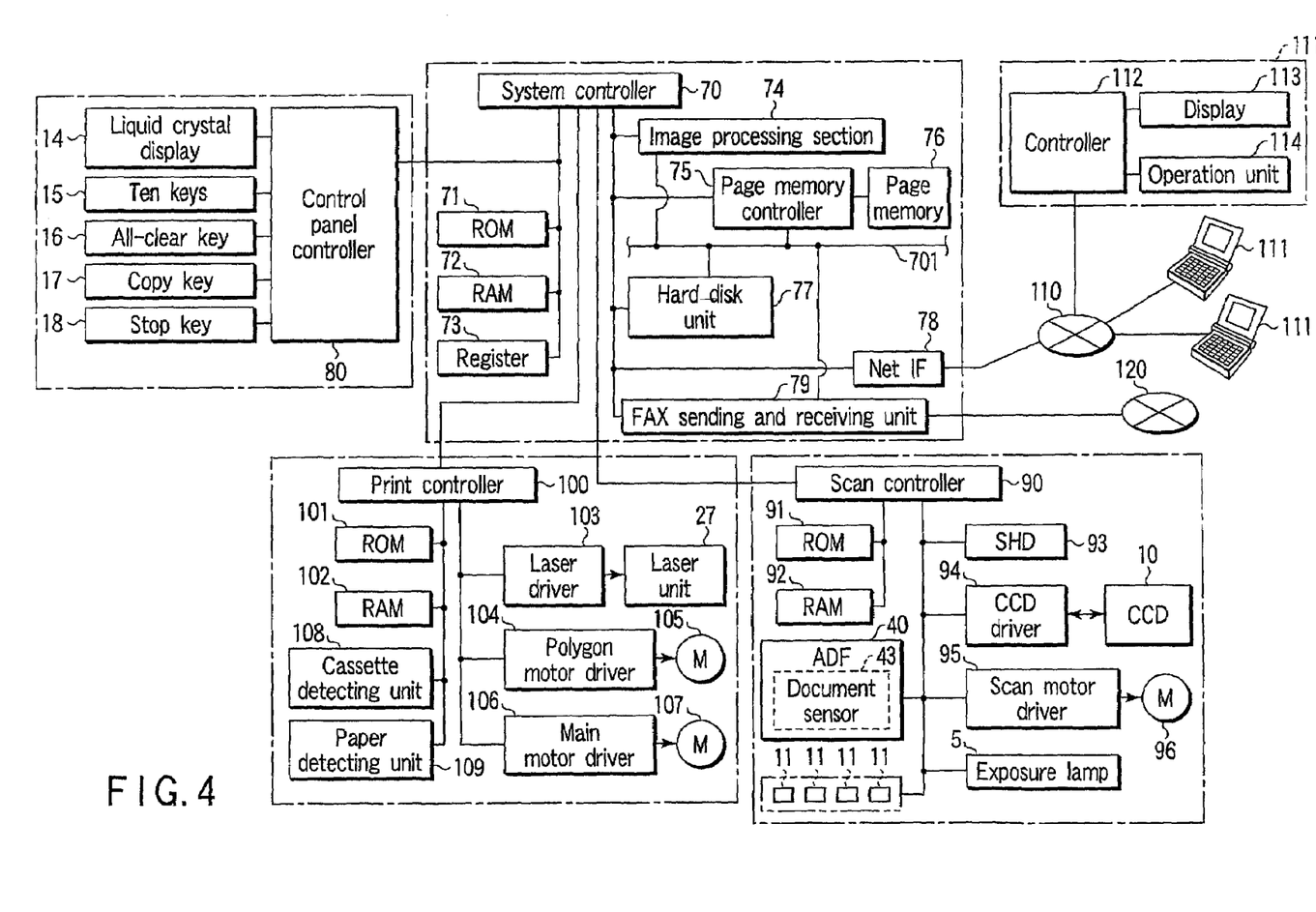
FIG. 4 is a block diagram showing a control circuit of the embodiment.

A control circuit of the whole device is shown in FIG. 4.

Figure 5:
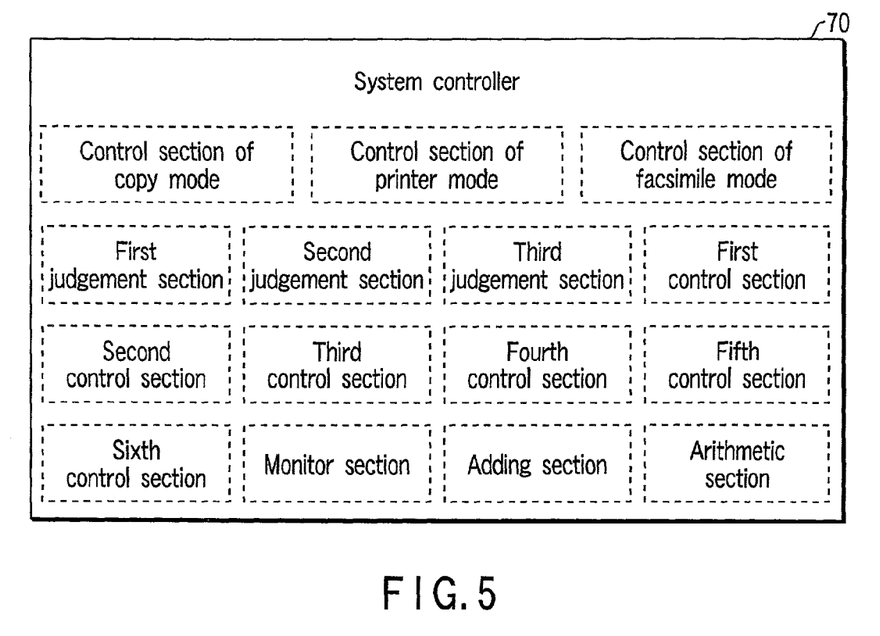
FIG. 5 is a view showing a structure of a system controller of the embodiment.

A system controller 70 is connected to a control panel controller 80, a scan controller 90, and a print controller 100. The system controller 70 controls the control panel controller 80, the scan controller 90, and the print controller 100 collectively, and as illustrated in FIG. 5, it is provided with a copy control section respondent to the operation of the copy key 17, a printer control section respondent to an image input to a net interface 78 described later, and a fax control section respondent to image reception by a FAX sending and receiving unit 79 described later.

The system controller 70 is connected with a ROM 71 for storing a control program, a RAM 72 for storing data, a register 73 for registering JOBs, an image processing section 74, a page memory controller 75, a hard disk unit 77, the net interface 78, and the FAX sending and receiving unit 79. The page memory controller 75 controls writing and reading of the image data to and from the page memory 76. An image data bus 701 connects the image processing section 74, the page memory controller 75, the page memory 76, the hard disk unit 77, the net interface 78, and the FAX sending and receiving unit 79 with each other.

The net interface 78 works as an input section for the printer mode for receiving an image (image data) transferred from external equipment. A network, for example, a LAN 110 is connected with the net interface 78, and external equipment, for example, a plurality of personal computers 111 are connected with the LAN 110. The personal computers 111 are respectively provided with a controller 112, a display 113, and an operation unit 114.

The FAX sending and receiving unit 79 is connected to a telephone line 120, and it works as a receiving section for the facsimile mode for receiving an image (image data) transferred from a facsimile through the telephone line 120.

The control panel controller 80 is connected with the liquid crystal display 14, the ten keys 15, the all-clear key 16, the copy key 17, and the stop key 18.

The scan controller 90 is connected with the ROM 91 for storing a control program, the RAM 92 for storing data, a shading correction section (SHD) 93, a CCD driver 94, a scan mode driver 95, an exposure lamp 5, the automatic document feeding device 40, and a plurality of document sensors 11. The CCD driver 94 drives the CCD 10. The scan motor driver 95 drives a scan motor 96 for driving a carriage. The automatic feeding device 40 has a document sensor for detecting the document D set in the tray 41 and its size.

A reading section for the copy mode for optically reading the image of the document D is mainly formed by the scan controller 90.

The print controller 100 is connected with the ROM 101 for storing a control program, the RAM 102 for storing data, a laser driver 103, a polygon motor driver 104, a main motor driver 106, a cassette detecting unit 108, and a paper detecting unit 109. The laser driver 103 drives the laser unit 27. The polygon motor driver 104 drives a motor 105 of a polygon mirror for making the laser beam B scan the photoconductive drum 20. The main motor driver 106 drives the main motor 107 that is a driving source of the photoconductive drum 20 and a paper conveyer mechanism. The cassette detecting unit 108 detects that the respective paper cassettes 30 are set. The paper detecting unit 109 detects whether or not paper is accommodated in the respective paper cassettes 30.

A print section for printing the image read by the reading section, the image supplied to the net interface 78, and the image received by the FAX sending and receiving unit 79 on the paper sheet P of the respective paper cassettes 30 is mainly formed by the print controller 100.

Figure 6:
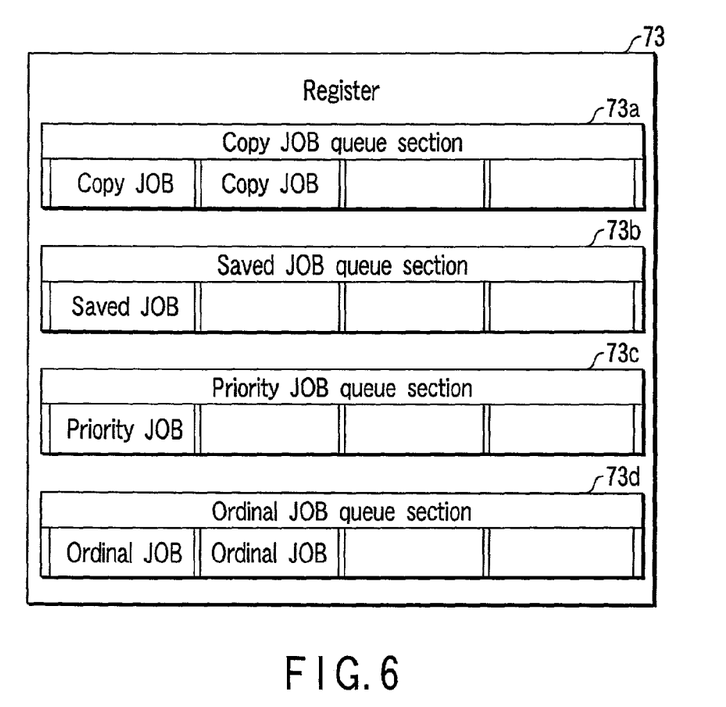
FIG. 6 is a view showing a structure of a register of the embodiment.

As illustrated in FIG. 6, the register 73 is formed by a first register, that is a copy JOB queue section 73a, a second register, that is a saved JOB queue section 73b, a third register, that is a priority JOB queue section 73c, and a fourth register, that is an ordinal JOB queue section 73d. These queue sections 73a, 73b, 73c, and 73d respectively have a plurality of register areas, where a plurality of JOB data is registered in the input order.

As illustrated in FIG. 5, the system controller 70 is provided with the control section for the copy mode, the control section for the printer mode, and the control section for the facsimile mode, as the main function, and is also provided with the following sections (1) to (12).

(1) a first judgment section for checking whether or not the proper sized paper sheet P for the JOB is accommodated in the respective paper cassettes 30, according to the judgment result of the paper detecting unit 109, when there occurs one of the copy JOB for printing the image read in the reading section, on the paper sheet P of the size specified by the liquid crystal display 14, the printer JOB for printing the image (image data) entered from the personal computer 111 into the net interface 78, on the paper sheet P of the size specified by the personal computer 111, and the facsimile JOB for printing the image received by the FAX sending and receiving unit 79 on the paper sheet P of the size specified previously, (2) a second judgment section for checking whether or not the corresponding JOB is the above copy JOB when the judgment result of the first judgment section is positive, (3) a first control section for registering the above copy JOB in the copy JOB queue section 73a when the judgment result of the second judgment section is positive, (4) a second control section for registering the JOB judged in the first judgment section into the saved JOB queue section 73b as the saved JOB when the judgment result of the first judgment section is negative, (5) a third judgment section for checking whether or not the number of copies for the JOB judged in the second judgment section is less than the predetermined reference number when the judgment result of the second judgment section is negative, (6) a third control section for registering the JOB judged in the third judgment section into the priority JOB queue section 73c as the priority JOB when the judgment result of the third judgment section is positive, (7) a fourth control section for registering the JOB judged in the third judgment section into the ordinal JOB queue section 73d as the ordinal JOB when the judgment result of the third judgment section is negative, (8) when the printing of the print section is finished, a monitor section for continually monitoring whether or not a JOB is registered in the respective queue sections; the copy JOB section 73a, the saved JOB queue section 73b, the priority JOB queue section 73c, and the ordinal JOB queue section 73d, in this order, (9) a fifth control section for executing the registered JOB at once when a JOB registered is found in the above monitor section, (10) an adding section for adding up the number of copies for each JOB in a predetermined time, for example, 24 hours when the "automatic setting mode of reference number" is set in the liquid crystal display 14, (11) an arithmetic section for requiring the mean value of the number of copies for each JOB by dividing the total of the adding section by the number of the execution times for each JOB at every predetermined time (24 hours) when the "automatic setting mode of reference number" is set in the liquid crystal display 14, (12) a sixth control section for updating the mean value or the value less than the mean value required in the above arithmetic section in the hard disk unit 77 as the reference number for checking the priority JOB.

Figure 7A:
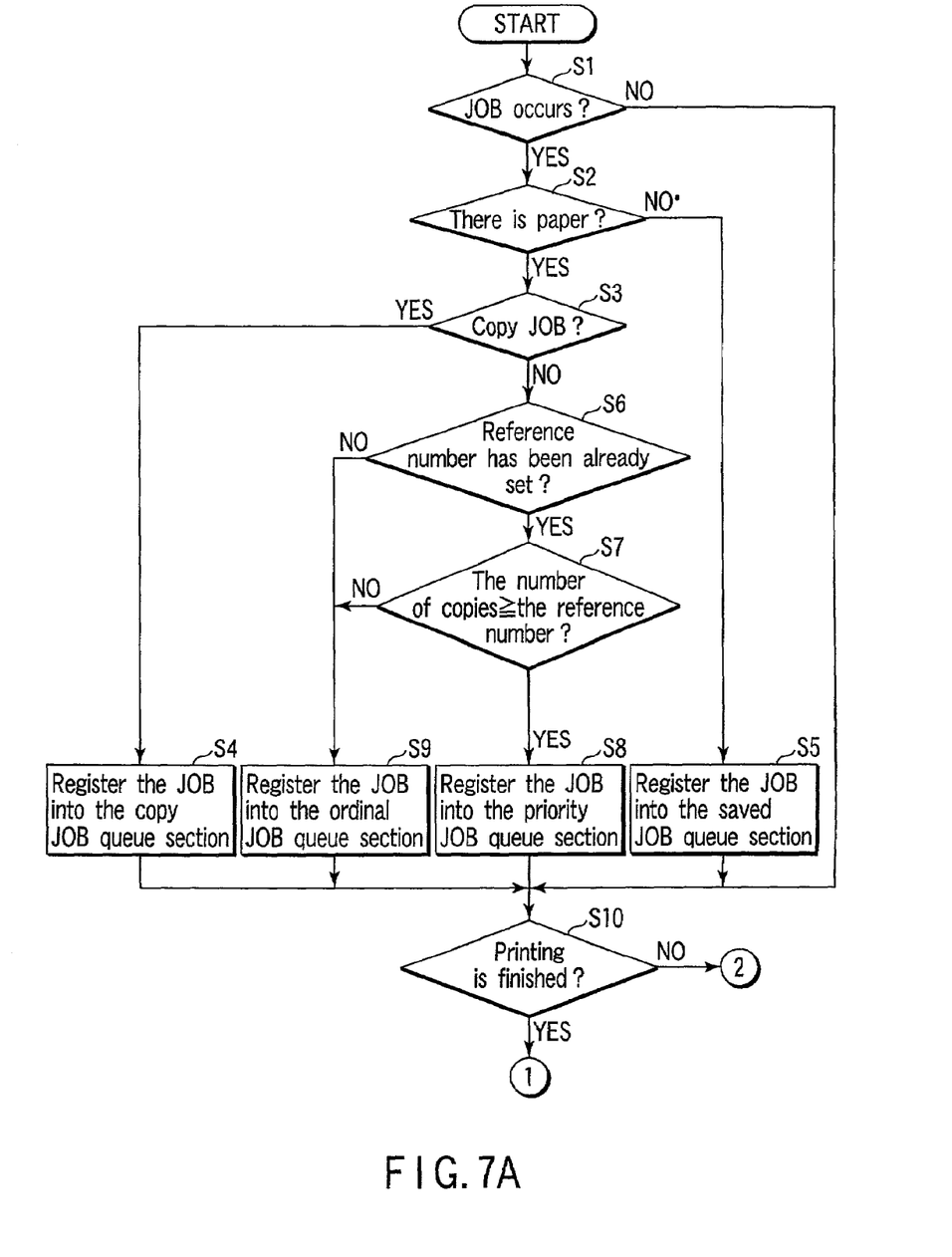
FIGS. 7A and 7B are flow charts for use in describing a function of the embodiment.
Figure 7B:
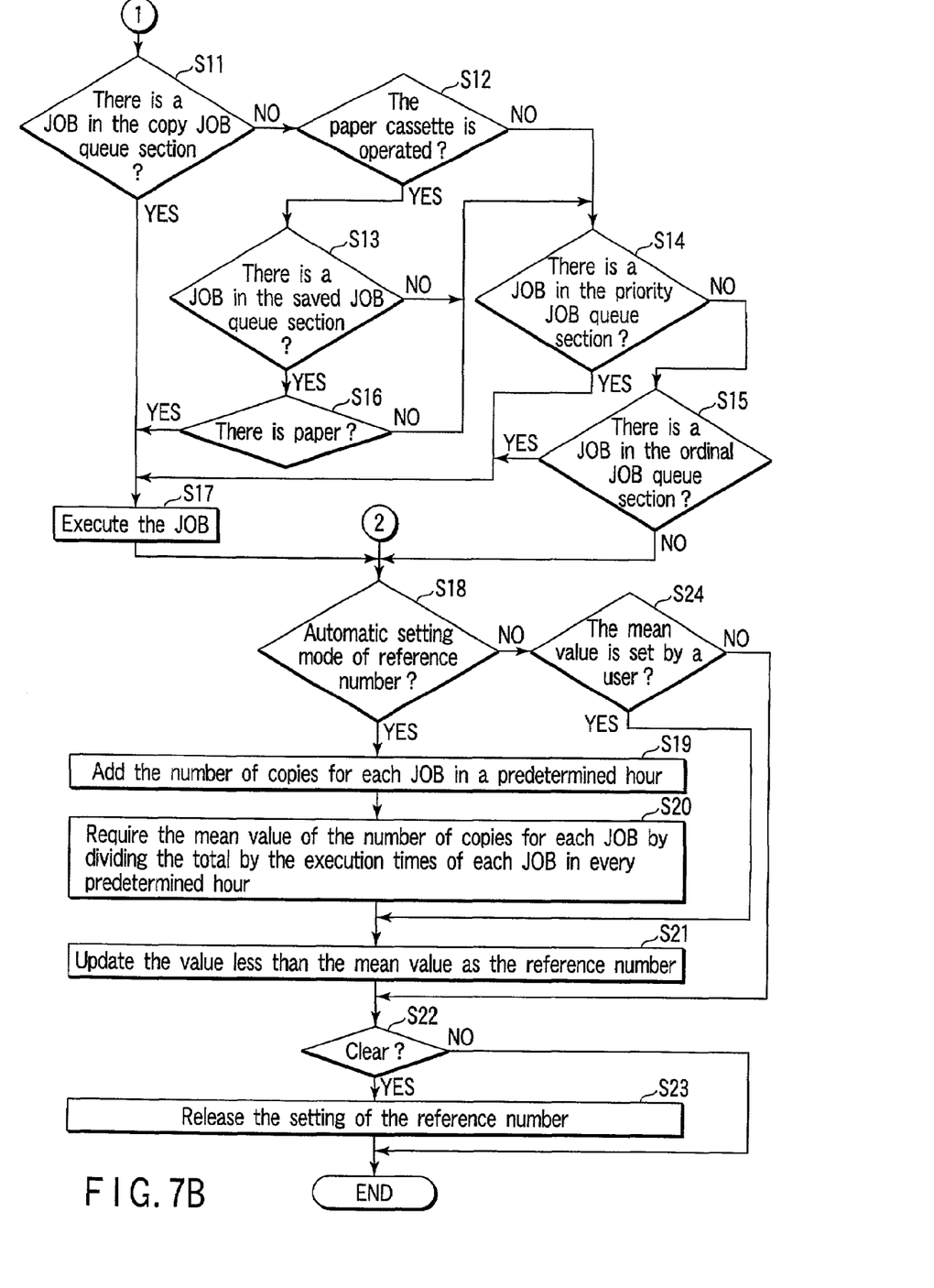

A function will be described with reference to the flow charts of FIGS. 7A and 7B.

When the document D is set on the document stand 2, the respective document sensors 11 detect the setting state and the size of the set document D. When the copy key 17 is activated, the image of the document D on the document stand 2 is read out and the read image (image data) is stored in the page memory 76. Here, there occurs the copy JOB for printing the read image on the paper sheet P of the size specified by the liquid crystal display 14 (YES in Step S1).

When the image (image data) transferred from the personal computer 111 is supplied to the net interface 78, the supplied image is stored in the page memory 76. Here, there occurs the printer JOB for printing the supplied image on the paper sheet P of the size specified by the personal computer 111 (YES in Step S1).

When the image (image data) transferred from a facsimile through the telephone line 120 is received by the FAX sending and receiving unit 79, the received image is stored in the page memory 76. Here, there occurs the facsimile JOB for printing the received image on the paper sheet P of the predetermined size (YES in Step S1).

The respective JOBs are formed by the data for specifying the image data within the page memory 76, the data for specifying the size of the paper sheet P, the data for specifying the number of copies, the data for specifying the font, the data for specifying single-sided printing or double-sided printing, and the data for specifying the post-processing such as sort, staple, and hole punch.

When there occurs one of the copy JOB, the printer JOB, and the facsimile JOB as mentioned above (YES in Step S1), whether or not the proper sized paper sheet P for the JOB having occurred is accommodated in the paper cassettes 30 is judged (Step S2).

When the proper sized paper P for the JOB is available (YES in Step S2), whether the same JOB is the copy JOB or not is judged (Step S3).

When the JOB having occurred is the copy JOB (YES in Step S3), the copy JOB is registered in the copy JOB queue section 73a (Step S4).

When the proper sized paper P for the JOB is not available occurred in the paper cassettes 30 (NO in Step S2), the JOB having occurred is registered in the saved JOB queue section 73b as a saved JOB (Step S5). Namely, when the proper sized paper P is not available in the cassettes 30, it is impossible to start printing. Accordingly, the JOB having occurred is saved in the saved JOB queue section 73b until the proper sized paper P is supplied. This enables the execution of other JOBs, occurring later, prior to the saved JOB.

When the JOB having occurred is not the copy JOB (NO in Step S3), whether the reference number for checking the priority JOB has been already set or not is judged (Step S6). When the reference number has been set (YES in Step S6), whether the number of copies for the JOB having occurred is less than the reference number or not is judged (Step S7).

When the number of copies for the JOB having occurred is less than the reference number (YES in Step S7), the JOB having occurred is registered in the priority JOB queue section 73c as a priority JOB (Step S8).

When the reference number has not been set (NO in Step S6), the JOB having occurred is registered in the ordinal JOB queue section 73d as an ordinal JOB (Step S9).

Also when the number of copies for the JOB having occurred is higher than or equal to the reference number (NO in Step S7), the JOB having occurred is registered in the ordinal JOB queue section 73d as an ordinal JOB (Step S9).

When the printing of the print section is finished (YES in Step S10), whether or not a JOB is registered in the queue sections 73a, 73b, 73c, and 73d is judged and monitored in the order of the queue sections 73a, 73b, 73c, and 73d (Steps S11, S12, S13, S14, and S15). Monitoring of the saved JOB queue section 73b (Step S13) is executed on condition that one of the paper cassettes 30 is operated (YES in Step S12). The operation of the paper cassettes 30 is to supply the proper sized paper P for the JOB, which is detected by the cassette detecting unit 108.

For example, when two copy JOBs are registered in the copy JOB queue section 73a, for example, as illustrated in FIG. 6, they are confirmed by the above monitoring (YES in Step S11). Of the two copy JOBs confirmed, a first copy JOB registered in the first register area in the uppermost portion is read out. The first copy JOB read out is executed at once (Step S17). Namely, the image read from the document D and stored in the page memory 76 is printed out on one sheet or several sheets of paper P of the size specified in the liquid crystal display 14. The sheet or sheets of paper P printed out are discharged from the outlet 37 to the tray 38.

When the first copy JOB is read out from the copy JOB queue section 73a, a second copy JOB registered in the second register area in the copy JOB queue section 73a is shifted to the first register area in the uppermost portion.

When printing of the first copy JOB is completed (YES in Step S10), whether or not a JOB is registered in the respective queue sections is again judged and repeatedly monitored in the order of the queue sections 73a, 73b, 73c, and 73d (Steps S11, S12, S13, S14, and S15). The second copy JOB registered in the copy JOB queue section 73a is confirmed by this monitoring (YES in Step S11). The second copy JOB confirmed is read out from the copy JOB queue section 73a. The second copy JOB read out is executed at once (Step S17).

When printing of the second copy JOB is completed (YES in Step S10), whether a JOB is registered in the respective queue sections is again judged and repeatedly monitored in the order of the queue sections 73a, 73b, 73c, and 73d (Steps S11, S12, S13, S14, and S15).

When there is no copy JOB registered in the copy JOB queue section 73a and there is one saved JOB registered in the saved JOB queue section 73b, as illustrated in FIG. 6, in the above monitoring, the saved JOB is confirmed (YES in Step S13). The confirmed saved JOB is that one registered in the saved JOB queue section 73b because of absence of the proper sized paper P.

When the saved JOB is confirmed (YES in Step S13), whether the proper sized paper P for the saved JOB has been supplied or not is judged (Step S16).

When the proper sized paper P for the saved JOB has been already supplied (YES in Step S16), the saved JOB is read out from the saved JOB queue section 73b. the read saved JOB is executed at once (Step S17). Namely, the image stored in the page memory 76 is printed out on one sheet or a plurality of sheets of the paper P.

When printing of the saved JOB is completed (YES in Step S10), whether a JOB is registered in the respective queue sections is again judged and repeatedly monitored in the order of the queue sections 73a, 73b, 73c, and 73d (Steps S11, S12, S13, S14, and S15).

When there is no copy JOB registered in the copy JOB queue section 73a and no saved JOB registered in the saved JOB queue section 73b and there is one priority JOB registered in the priority JOB queue section 73c in the above monitoring, as illustrated in FIG. 6, the priority JOB is confirmed (YES in Step S14).

When the priority JOB is confirmed (YES in Step S14), the priority JOB is read out from the priority JOB queue section 73c. The read priority JOB is executed at once (Step S17). Namely, the image stored in the page memory 76 is printed out on one sheet or a plurality of sheets of the paper P.

When printing of the priority JOB is completed (YES in Step S10), whether or not a JOB is registered in the respective queue sections is again judged and repeatedly monitored in the order of the queue sections 73a, 73b, 73c, and 73d (Steps S11, S12, S13, S14, and S15).

When there is no copy JOB registered in the copy JOB queue section 73a, no saved JOB registered in the saved JOB queue section 73b, and no priority JOB registered in the priority JOB queue section 73c and there are two ordinal JOBs registered in the ordinal JOB queue section 73d in the above monitoring, as illustrated in FIG. 6, the two ordinal JOBs are confirmed (YES in Step S15).

Of the two ordinal JOBS confirmed, the first ordinal JOB registered in the first register area in the uppermost portion is read out. The first ordinal JOB read out is executed at once (Step S17). Namely, the image stored in the page memory 76 is printed out on one sheet or several sheets of the paper P.

When the first ordinal JOB is read out from the ordinal JOB queue section 73d, the second ordinal JOB registered in the second register area of the ordinal JOB queue section 73d is shifted to the first register area in the uppermost portion.

When printing of the first ordinal JOB is completed (YES in Step S10), whether or not a JOB is registered in the respective queue sections is again judged and repeatedly monitored in the order of the queue sections 73a, 73b, 73c, and 73d (Steps S11, S12, S13, S14, and S15).

When a new copy JOB is confirmed in the copy JOB queue section 73a in the above monitoring (YES in Step S11), the confirmed copy JOB is read out from the copy JOB queue section 73a and the read copy JOB is executed at once (Step S17).

When printing of the copy JOB is completed (YES in Step S10), whether or not a JOB is registered in the respective queue sections is again judged and repeatedly monitored in the order of the queue sections 73a, 73b, 73c, and 73d (Steps S11, S12, S13, S14, and S15).

When there is no JOB registered in the copy JOB queue section 73a, the saved JOB queue section 73b, and the priority JOB queue section 73c and the second ordinal JOB remaining in the ordinal JOB queue section 73d is confirmed, the ordinal JOB is read out. The read ordinal JOB is executed at once (Step S17).

When the "automatic setting mode of reference number" is set in the liquid crystal display 14 (YES in Step S18), the number of copies for each JOB executed is added up in a predetermined time (24 hours) (Step S19). As for the double-sided printing JOB of printing an image on the front surface and the rear surface of one sheet of paper P, the number of copies is counted as one on the front surface and another on the rear surface, i.e. two.

The mean value of the number of copies for each JOB is required by dividing the above total by the number of the execution times of each JOB at every predetermined time interval (24 hours) (Step S20). The value of, for example, one third of the required mean value is updated in the hard disk unit 77 as the reference number for judgment of the priority JOB (Step S21). The hard disk unit 77 holds the stored reference number even if the power switch 39 of the main body 1 is turned off.

When the operation for clearing the reference number is executed in the liquid crystal display 14 (Step S22), the setting of the reference number within the hard disk unit 77 is released (Step S23). After the predetermined time (24 hours) from this release, a new reference number is set (Steps S18, S19, S20, and S21). When a predetermined time elapses from the release, the setting of the reference number is impossible and all the JOBs other than the copy JOB are registered in the ordinal JOB queue section 39d (Steps S1, S2, S3, S6, and S9).

The predetermined time period (24 hours) can be changed by the operation of the liquid crystal display 14.

When the "automatic setting mode of reference number" is reset in the liquid crystal display 14 (NO in Step S18), a user can set the reference number. Namely, when the mean value of the number of copies for each JOB is set in the liquid crystal display 14 (YES in Step S24), the value of one third of the set mean value is updated in the hard disk unit 77 as the reference number for judgment of the priority JOB (Step S21).

Also in this case, when the operation for clearing the reference number is executed in the liquid crystal display 14 (Step S22), the setting of the reference number within the hard disk unit 77 is released (Step S23).

As mentioned above, the copy JOB instructed by a user standing in front of the main body 1 is executed as a top priority, prior to the printer JOB and the facsimile JOB sent from the outward. This can solve the problem of making a user wait in front of the main body 1 for a long time.

The JOB which cannot be printed out because of absence of proper sized paper P can be saved in the saved JOB queue section 73b until the proper sized paper P is supplied, thereby starting the copy JOB occurring later at once without delay.

The JOB of a few copies (the number of copies is less than the reference number) is executed with higher priority than the JOB of many copies. This can solve a problem of delaying the JOB of a few copies until the JOB of many copies is finished. Especially, by setting the "automatic setting mode of reference number", the reference number used for checking the number of copies can be properly set and updated depending on the sate of use everyday.

Accordingly, the present invention can perform a plurality of JOBs efficiently in an extremely short waiting time.

Additional advantages and modifications will readily occur to those skilled in the art. Therefore, the invention in its broader aspects is not limited to the specific details and representative embodiments shown and described herein. Accordingly various modifications may be made without departing from the spirit or scope of the general inventive concept as defined by the appended claims and their equivalents.

What is claimed is:

1. An image forming apparatus executing a plurality of JOBs comprising:
   a document stand which puts a document thereon;
   a reading section for a copy mode which optically reads an image of the document put on the document stand;
   an input section for a printer mode which enters an image transferred from an external device;
   a plurality of paper holding sections where paper is respectively accommodated in different sizes;
   a print section which prints the image read by the reading section and the image entered by the input section on the paper of the respective paper holding sections;
   an operational section which specifies the size of the paper;
   first, second, third, and fourth registers;
   a first judgment section which checks whether or not the proper sized paper for the JOB exists in the paper holding sections when there occurs a copy JOB for printing the image read by the reading section on the paper of the size specified by the operational section, or a printer JOB for printing the image entered by the input section on the paper of the size specified by the external device;
   a second judgment section which checks whether or not the JOB judged in the first judgment section is the above copy JOB when the judgment result of the first judgment section is positive;
   a first control section which registers the above copy JOB into the first register when the judgment result of the second judgment section is positive;

a second control section which registers the JOB judged in the first judgment section into the second register as a saved JOB when the judgment result of the first judgment section is negative;

a third judgment section which checks whether or not the number of copies for the JOB judged in the second judgment section is less than a predetermined reference number when the judgment result of the second judgment section is negative;

a third control section which registers the JOB judged in the third judgment section into the third register as a priority JOB when the judgment result of the third judgment section is positive;

a fourth control section which registers the JOB judged in the third judgment section into the fourth register as an ordinal JOB when the judgment result of the third judgment section is negative;

a monitor section which continually monitors whether or not a JOB is registered in the respective registers in the order of the first, the second, the third, and the fourth registers when printing of the print section is completed; and a fifth control section which executes the registered JOB at once when a JOB registered is found in the above monitor section.

2. The apparatus according to claim 1, further comprising the respective registers which register a plurality of JOBs in the order of input.

3. The apparatus according to claim 1, further comprising:
an arithmetic section which requires the mean value of the number of copies for each JOB in a predetermined time; and
a sixth control section which updates the mean value required by the arithmetic section or the value less than the mean value as the reference number of copies.

4. The apparatus according to claim 1, further comprising:
an adding section which adds up the number of copies for each JOB in the predetermined hour;
an arithmetic section which requires the mean value of the number of copies for each JOB by dividing the total of the adding section by the number of the execution times for each JOB at every predetermined time interval; and
a sixth control section which updates the mean value required by the arithmetic section or the value less than the mean value as the reference number of copies.

5. The apparatus according to claim 1, further comprising:
a second operational section which sets and resets an automatic setting mode of the reference number;
an adding section which adds up the number of copies for each JOB in a predetermined time when the automatic setting mode of the reference number is set in the second operational section;
an arithmetic section which requires the mean value of the number of copies for each JOB by dividing the total of the adding section by the number of the execution times for each JOB at every predetermined time interval, when the automatic setting mode of the reference number is set in the second operational section; and
a sixth control section which updates the mean value required by the arithmetic section or the value less than the mean value as the reference number of copies.

6. The apparatus according to claim 1, further comprising a receiving section for facsimile mode which receives an image sent from a facsimile.

7. The apparatus according to claim 6, wherein the print section further prints out the image received by the receiving section on the paper of the paper holding section.

8. The apparatus according to claim 7, wherein the first judgment section checks whether or not the proper sized paper for the JOB exists in some of the paper holding sections when there occurs one of the copy JOB for printing the image read by the reading section on the paper of the size specified by the operational section, the printer JOB for printing the image entered into the input section on the paper of the size specified by the external device, and the facsimile JOB for printing the image received by the receiving section on the paper of the size specified previously.

9. An image forming apparatus executing a plurality of JOBS comprising:
a document stand for putting a document thereon;
a reading section for a copy mode for optically reading an image of the document put on the document stand;
an input section for printer mode for entering an image transferred from an external device;
a plurality of paper holding sections where paper is respectively accommodated in different sizes;
a print section for printing the image read by the reading section and the image entered by the input section on the paper of the respective paper holding sections;
operational means for specifying the size of the paper in the respective paper holding sections;
a first, a second, a third, and a fourth registers;
first judgment means for checking whether or not the proper sized paper for the JOB exists in the paper holding sections when there occurs a copy JOB for printing the image read by the reading section on the paper of the size specified by the operational means, or a printer JOB for printing the image entered by the input section on the paper of the size specified by the external device;
second judgment means for checking whether or not the JOB judged in the first judgment means is the above copy JOB when the judgment result of the first judgment means is positive;
first control means for registering the above copy JOB into the first register when the judgment result of the second judgment means is positive;
second control means for registering the JOB judged in the first judgment means into the second register as a saved JOB when the judgment result of the first judgment means is negative;
third judgment means for checking whether or not the number of copies for the JOB judged in the second judgment means is less than a predetermined reference number when the judgment result of the second judgment means is negative;
third control means for registering the JOB judged in the third judgment means into the third register as a priority JOB when the judgment result of the third judgment means is positive;
fourth control means for registering the JOB judged in the third judgment means into the fourth register as an ordinal JOB when the judgment result of the third judgment means is negative;
monitor means for repeatedly monitoring whether or not a JOB is registered in the respective registers in the order of the first, the second, the third, and the fourth registers when printing of the print section is completed; and a fifth control section for executing the registered JOB at once when a JOB registered is found in the above monitor section.

10. The apparatus according to claim 9, further comprising
the respective registers which register a plurality of JOBs in the order of input.

11. The apparatus according to claim 9, further comprising:
an arithmetic section for requiring the mean value of the number of copies for each JOB in a predetermined time; and
a sixth control section for updating the mean value required by the arithmetic section or the value less than the mean value as the reference number of copies.

12. The apparatus according to claim 9, further comprising:
an adding section for adding up the number of copies for each JOB in the predetermined time;
an arithmetic section for requiring the mean value of the number of copies for each JOB by dividing the total of the adding section by the number of the execution times for each JOB at every predetermined time interval; and
a sixth control section for updating the mean value required by the arithmetic section or the value less than the mean value as the reference number of copies.

13. The apparatus according to claim 9, further comprising:
second operational means for setting and resetting an automatic setting mode of the reference number;
adding means for adding up the number of copies for each JOB in a predetermined time when the automatic setting mode of the reference number is set in the second operational means;
an arithmetic section for requiring the mean value of the number of copies for each JOB by dividing the total of the adding section by the number of the execution times for each JOB at every predetermined time interval, when the automatic setting mode of the reference number is set in the second operational means; and
a sixth control section for updating the mean value required by the arithmetic section or the value less than the mean value as the reference number of copies.

14. The apparatus according to claim 9, further comprising
a receiving section for facsimile mode for receiving an image sent from a facsimile.

15. The apparatus according to claim 14, wherein
the print section further prints out the image received by the receiving section on the paper of the respective paper holding sections.

16. The apparatus according to claim 15, wherein
the first judgment section checks whether or not the proper sized paper for the JOB exists in the respective paper holding sections when there occurs one of the copy JOB for printing the image read in the reading section on the paper of the size specified by the operational section, the printer JOB for printing the image entered into the input section on the paper of the size specified by the external device, and the facsimile JOB for printing the image received by the receiving section on the paper of the size specified previously.

17. A method of controlling the image forming apparatus executing a plurality of JOBs having
a document stand for putting a document thereon;
a reading section for a copy mode for optically reading an image of the document put on the document stand;
an input section for printer mode for entering an image transferred from an external device;
a plurality of paper holding sections where paper is respectively accommodated in different sizes;
a print section for printing the image read by the reading section and the image entered by the input section on the paper of the respective paper holding sections;
operational means for specifying the size of the paper in the respective paper holding means; and
a first, a second, a third, and a fourth registers, the method comprising:
a first step for checking whether or not the proper sized paper for the JOB exists in the paper holding sections when there occurs a copy JOB for printing the image read by the reading section on the paper of the size specified by the operational means or a printer JOB for printing the image received by the input section on the paper of the size specified by the external device;
a second step for checking whether or not the JOB judged in the first step is the copy JOB when the judgment result of the first step is positive;
a third step for registering the copy JOB in the first register when the judgment result of the second step is positive;
a fourth step for registering the JOB judged in the first step into the second register as a saved JOB when the judgment result of the first step is negative;
a fifth step for checking whether or not the number of copies for the JOB judged in the second step is less than a predetermined reference number when the judgment result of the second step is negative;
a sixth step for registering the JOB judged in the fifth step into the third register as a priority JOB when the judgment result of the fifth step is positive;
a seventh step for registering the JOB judged in the fifth step into the fourth register as an ordinal JOB when the judgment result of the fifth step is negative;
an eighth step for continually monitoring whether or not a JOB is registered in the respective registers in the order of the first, the second, the third, and the fourth registers when printing of the print section is completed; and
a ninth step for executing the registered JOB at once when a JOB registered is found in the eighth step.

18. The method according to claim 17, wherein
the apparatus has a receiving section for facsimile mode for receiving an image sent from a facsimile.

19. The method according to claim 18, wherein
the print section of the apparatus further prints out the image received by the receiving section on the paper of the paper holding sections.

20. The method according to claim 19, wherein
the first step checks whether or not the proper sized paper for the JOB exists in the respective paper holding sections when there occurs one of the copy JOB for printing the image read by the reading section on the paper of the size specified by the operational section, the printer JOB for printing the image entered into the input section on the paper of the size specified by the external device, and the facsimile JOB for printing the image received by the receiving section on the paper of the size specified previously.

* * * * *